(No Model.) 4 Sheets—Sheet 4.

C. P. BONNETT.
PROCESS OF AND APPARATUS FOR EXTRACTING GOLD AND SILVER FROM THEIR ORES.

No. 298,663. Patented May 13, 1884.

WITNESSES
Wm A. Skinkle
Jos. S. Latimer

INVENTOR
Charles P. Bonnett,
By his Attorneys
Pope Edgecomb & Butler

UNITED STATES PATENT OFFICE.

CHARLES P. BONNETT, OF ELIZABETH, NEW JERSEY.

PROCESS OF AND APPARATUS FOR EXTRACTING GOLD AND SILVER FROM THEIR ORES.

SPECIFICATION forming part of Letters Patent No. 298,663, dated May 13, 1884.

Application filed December 3, 1883. (No model.)

*To all whom it may concern:*

Be it known that I, CHARLES P. BONNETT, a citizen of the United States of America, residing at Elizabeth, in the county of Union and State of New Jersey, have invented a new and improved process for extracting gold and silver from their ores by the combined action of mercury, electricity, and water, and a new and improved form of apparatus for the purpose of better carrying out and applying the same, of which the following is a specification.

My invention relates to a process for extracting gold and silver from their ores by the combined action of mercury, electricity, and water. By means of this process ores containing sulphurets of other metals and other impurities, as well as free gold in an infinitely small state of division, can be more perfectly amalgamated and a larger proportion of free gold saved than has heretofore been possible, owing to the tendency in the ordinary processes of the impurities in such ores to collect on the surface of the mercury, and thereby prevent amalgamation.

My new improved process consists—

First. In introducing into a column of water or slime containing the gold and silver ores to be treated in a fine state of division, and descending vertically under a constant pressure, a quantity of mercury largely in excess of what is necessary to amalgamate the precious metals contained in the ores, in the form of very fine globules or spray, causing these globules to be thoroughly intermingled with the particles of ore suspended in the descending column of water. This may be done by means of any suitable mechanical device, and at the same time a current of electricity is caused to traverse the column of water at and around the points where the mercury enters it.

Second. After leaving the vessel in which the first stage of the process is conducted, the water or slime containing the particles of ore, sand, &c., is forced in a thin stream between an electrified revolving copper plate and bath of mercury, and then washed as it emerges over a copper plate provided with any number of riffles or baths containing mercury at convenient distances from one another, fitted or not with agitators. A current of electricity is passed through the water as it traverses each riffle or trough for the purpose of cleansing the surface of the mercury and facilitating the amalgamation on the copper-plate surfaces of any free gold or other precious metal which may have escaped amalgamation in the first stage of the process.

Third. In causing the overflow-water from the riffles to flow over a perfectly-flat copper plate, over which any number of loosely-hung blankets revolve, for the purpose of taking up any particles of ore and free gold that may be left in the water for further treatment.

Fourth. In collecting the mercury which has been used in the different stages of the process, and continuing to use it until it becomes too thoroughly alloyed with the precious metals to admit of further manipulation. The introduction of an electric current, as specified, causes a continual agitation of the particles of auriferous and argentiferous ores, sand, &c., and prevents what is termed "sickening" of the mercury in the presence of arsenic, sulphur, oil, or any other known substances which are deleterious to the amalgamation of mercury with gold and silver.

My improved process consists not in this application of the electric current for the purposes aforesaid, for this is by no means new, but in causing the water or slime, by means of suitable apparatus, to take the form of a constantly-descending vertical column in forcing into it an excess of mercury in the manner specified, and at the same time effecting the admixture of the particles of ore and the mercury by mechanical means, and then subjecting such portions as have escaped amalgamation to treatment upon copper plates and blankets. By introducing mercury into the medium used for conveying the ore, in the form of globules or in a very fine spray, a more thorough contact of the particles of the ore, and more especially of the very finely divided particles of free gold, with the mercury is effected than has heretofore been possible, a larger amalgamating-surface is presented to the ore, &c., and a greater surface of mercury is exposed to the cleansing action of the electric current. If the mercury is introduced into the column of water at the point where the particles are agitated by the aforesaid current of electricity and mechanical device, amalgamation is effected under the most advantageous circumstances, and the force with which the globules of mercury enter the column of water is useful in facilitating the process of admixture. The column of water being vertical and descending constantly, the particles of ore, sand, &c., will, after passing out of the path of the electric current, be carried downward in layers, according to their specific gravity, together with the globules of mercury. The latter, however, owing to their greater specific gravity, will fall more quickly, and will consequently pass through the successive layers of ore or sand particles, and afford further opportunity for amalgamation. A current of electricity may be made to enter the column of water or slime at any other point or points below those where the mercury is introduced, for the purpose of producing further agitation and consequent admixture of the globules with the ore or sand particles, and at the same time to prevent sickening of the mercury in the presence of impurities.

The mercury used in this process may be either hot or cold. I prefer, however, to heat it to a high temperature, as this facilitates the amalgamation of the precious metals.

For the purpose of better carrying out and applying my improved process, I have invented an apparatus of which the following is a description, and which is to be taken in connection with the accompanying drawings, in which—

Similar letters refer to similar parts throughout the several views.

Figure 1:
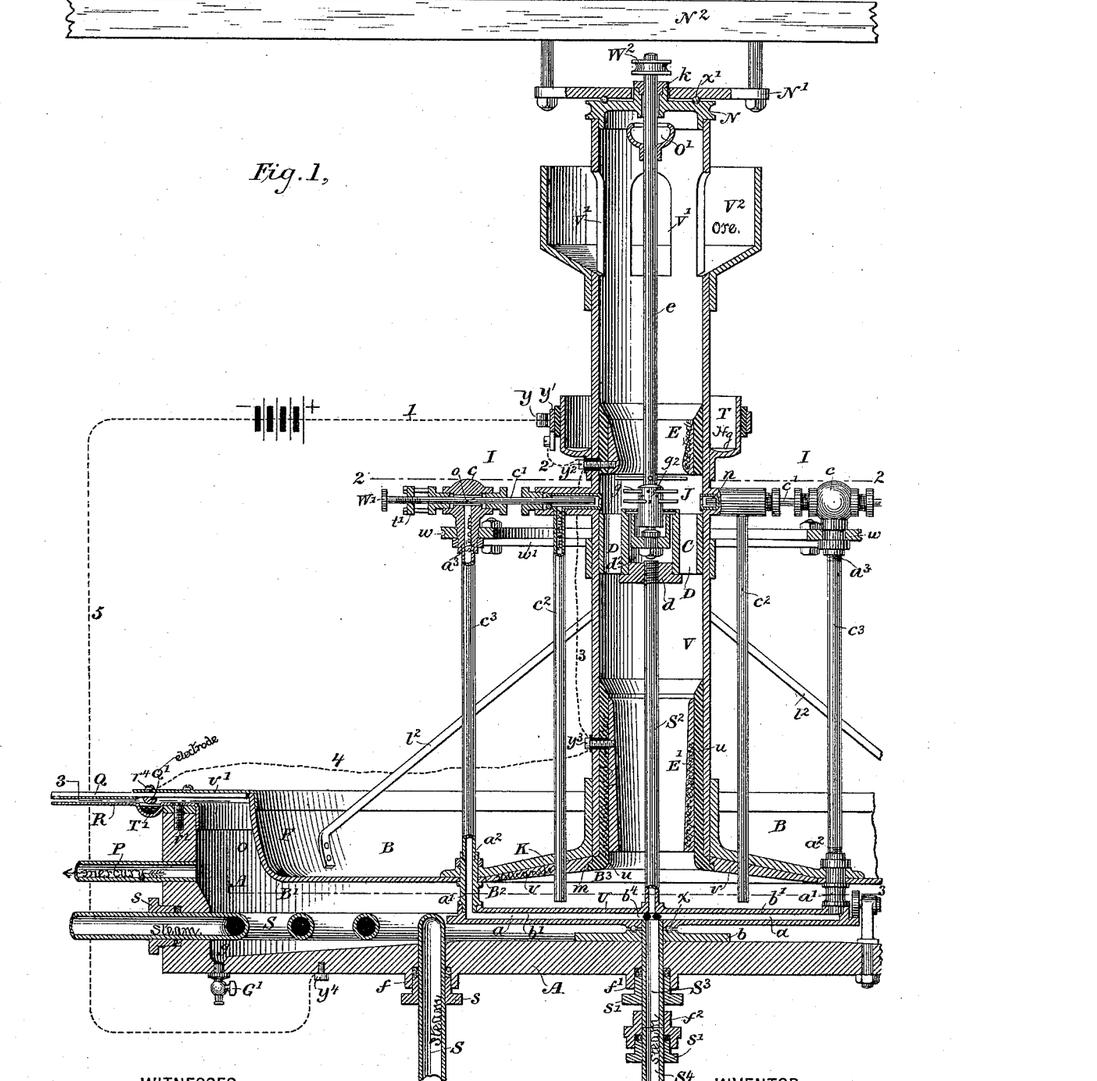
Figure 1 is a sectional elevation of the apparatus.
Figure 2:
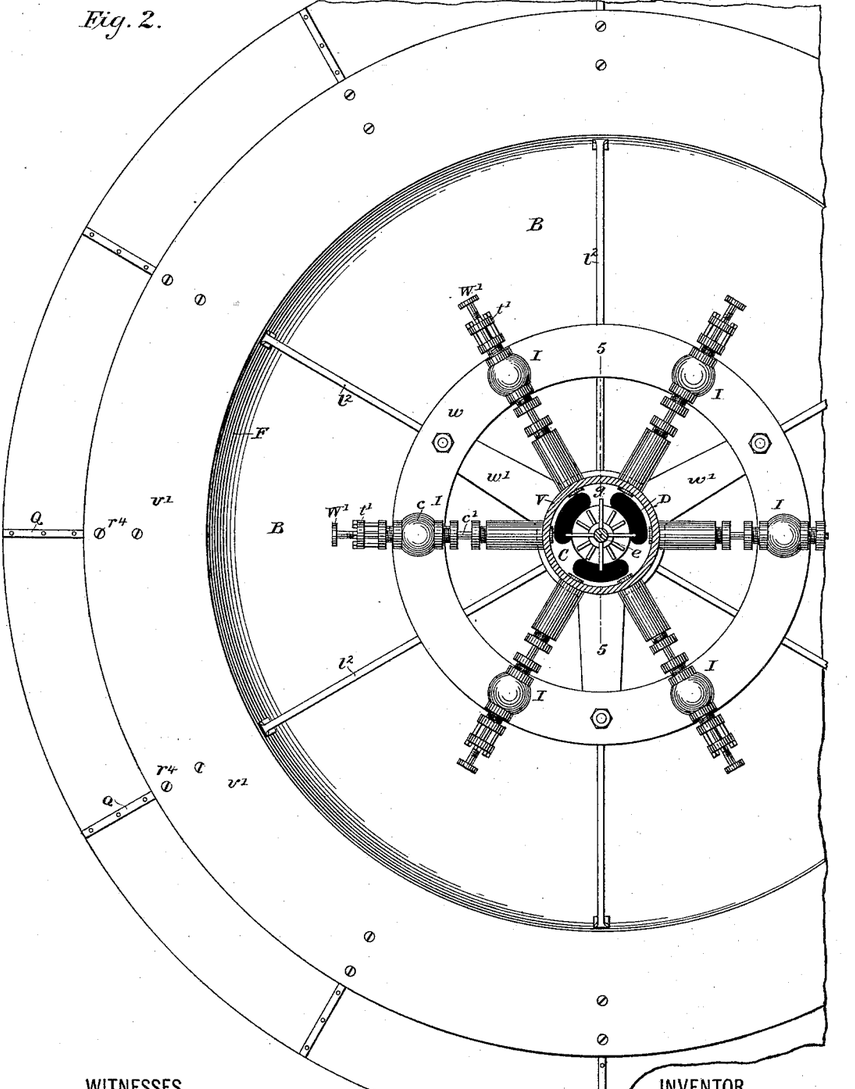
Fig. 2, a horizontal cross-section on the line 2 2 of Fig. 1.
Figure 3:
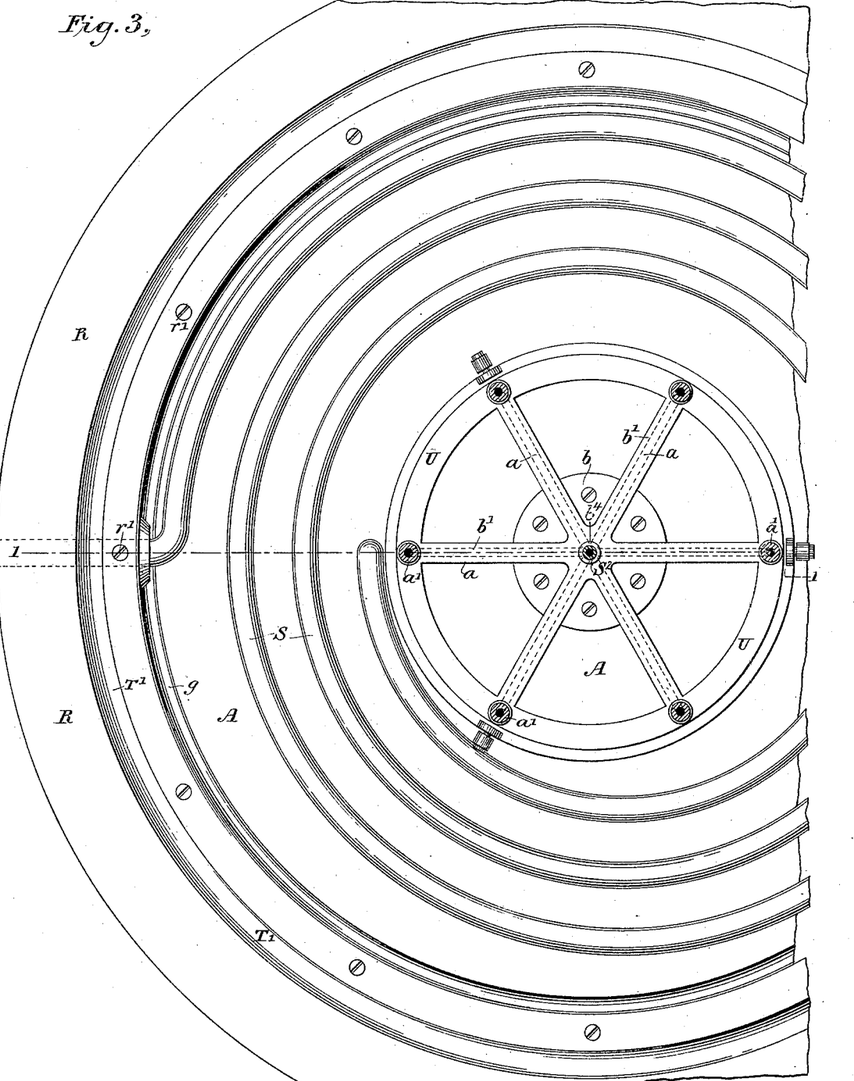
Fig. 3, a horizontal cross-section on the line 3 3 of Fig. 1.

A is a cylindrical vessel for holding mercury, insulated or not, of cast-iron or other suitable material, and of any desired dimensions. The shape of this vessel is best seen by reference to its vertical cross-section shown in Fig. 1. The bottom, it will be seen, is flat on the outside and partially sloping on the inside, being flat and slightly higher at the center than at the sides, and is provided with a gutter or groove, $g$, of suitable depth, adjacent to the inner wall of the vessel, and a stop-cock, G', for the purpose of drawing off the amalgam as it collects. In this vessel is placed a coil of cast or wrought iron steam-heating pipes, S, of any suitable thickness or size for the purpose of heating the mercury. Their disposition is shown in Figs. 1 and 2, and the smallest diameter of the coil must be sufficiently large to admit of the revolution of the wheel U. The packing-boxes $s$, screwing into the flanges $f$, cast upon the surface of the vessel A, prevent the escape of steam or mercury through the spaces around the steam-coil. The pipe P serves to allow the mercury to be pumped off continuously for the purpose of supplying it again to the apparatus. In the center of the vessel A is a circular bearing-plate, $b$, supporting, by means of a ball-bearing, $x$, the cast-iron wheel U with the spokes $b'$, Figs. 1 and 2, of suitable dimensions, in the spokes of which are placed the steam passages $a\ a\ a$. The wheel U is held upon the ball-bearing $x$, and thereby prevented from being displaced by the float of the mecury in the apparatus by means of any number of rollers, $l'\ l'$, supported upon vertical pillars $l$, of suitable material, touching upon the upper surface of the wheel U, as shown in Figs. 1 and 3. These pillars are bolted through the bottom of the vessel A, as will be seen by reference to Fig. 1.

Through the center of the bearing $b$ and the point of intersection of the steam-passages $a\ a$ passes the steam-pipe $S^3$, forming with the steam-passages $a\ a$, at the point $b^4$, an eight-way joint. Packing-boxes $s'$, screwing into the coupling-ring $f^2$, and the flange $f'$, cast upon the bottom of the vessel A, prevent the escape of steam or mercury through the spaces around the steam-pipe $S^3$, to which steam is supplied through the pipe $S^4$, screwed into the coupling-ring $f^2$.

The copper cover or top B of the vessel A is supported by the vertical hollow standards $a'\ a'$, screwed into the wheel U at the extremities of the steam-passages $a\ a\ a$. Their disposition will be seen by reference to Figs. 1 and 3. These hollow standards may be of any suitable material and size, if sufficiently strong to carry the revolving copper cover and the mechanism connected therewith. Their interior diameter should be the same as that of the steam-passages $a\ a\ a$. The shape of the cover or top B is seen by reference to Fig. 1, which shows a vertical cross-section thereof. It is a copper plate of the shape shown, fitting over the standards $a'$, as shown in Fig. 1, and brazed to the flanged collar K, which is a metal casting of the shape shown. The bottom of B is flat from B' to $B^2$. The conical portion of the collar K (represented by the line $B^2\ B^3$) is carefully turned down, and to it is fitted a thin annular vulcanite disk, $v$, as shown in Fig. 1, which locks into a mortised head, $m$, on the bottom of the insulating-cylinder $u$, the object of this being to hold the disk $v$ in place, and at the same time do away with all methods of fastening that would interfere with insulation. The inner surface, $B^2\ B^3$, of the insulating-disk $v$ is made sloping, as shown in Fig. 1, with a view to compressing the current flowing through the apparatus into a thin stream at the point $B^2$.

The chamber V, in which the first stage of the process is carried out, may be of any desirable shape; but for the sake of convenience I prefer to make it cylindrical. It is carefully fitted and brazed at the base to the collar K, and is further held in place by means of the lateral stays $l^2$. The dimensions of the cylinder V and the copper cover B, and to some extent the shape of the latter, will depend on the size of the apparatus and the pressure of the water or slime passing through it. The cylinder V may be of any height, according to the pressure desired, and it may be of any diameter, according to the size of the apparatus, and its thickness, as well as that of the cover B, will increase accordingly. The flange F of the cover B is made to incline more or less from or toward the perpendicular, according as the flow of water or slime through the apparatus is to be slow or fast. The weight of the column of water or slime in V will be compensated to a certain extent by the volume of mercury in A, and as the pressure in the cylinder V is proportionate to the height of mercury in the space between the side walls of A and the flange F, the lower the mercury stands in this space the more rapid is the overflow. The outer circumference of the cover B and the direction of inclination of the flange F determine the volume of this space, and they will vary in proportion to the volume of mercury desired to be used in the apparatus. When the apparatus is working it will be possible to regulate the volume of mercury in the sides of the vessel A, so as to make the overflow almost constant.

Figure 4:
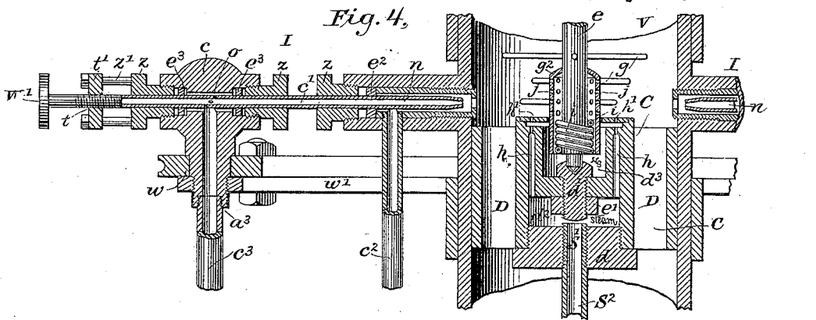
Fig. 4, a detailed view of the injectors and the agitator.
Figure 5:
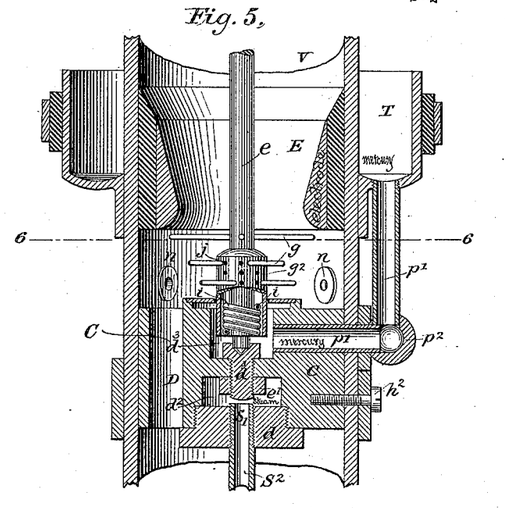
Fig. 5, a vertical cross-section of the mixing-chamber on the line 5 5 of Fig. 2, and Fig. 6 a plan view of the central injector on the line 6 6 of Fig. 5.
Figure 6:
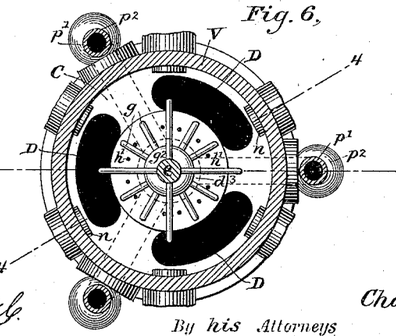

In the chamber V, at any desirable distance above its base, is placed the vertical atomizer and injector C, which is incidentally an agitator-bearing and an electrode, and which is shown in detail in Figs. 4, 5, and 6. It is a metal casting of the shape shown in the views and of suitable dimensions, both of which, however, will vary with the shape and size of the chamber V. The oval holes D are for the purpose of allowing the water or slime to pass through it, and are as large as is practicable. This injector and bearing-ring C is supported in the cylinder V by being screwed upon a collar, $d$, which in its turn is screwed upon the extremity of the steam-pipe $S^2$, whose length is regulated accordingly. It is then firmly secured to the walls of the cylinder V by lateral screws $h^2$ $h^2$.

$d^2$ is a cylindrical steam-chamber, with the six or any other convenient number of steam-vents $h$ $h$. The agitator-spindle $e$ revolves in the bearing $d'$, which is screwed into the casting C, as shown in Fig. 4, and is clamped by the capstan-screw $e'$. Mercury is admitted into the space $d^3$, around the bottom of the spindle $e$, through the pipes $p'$. The spindle $e$, which may be of steel or other suitable metal, and of convenient dimensions, is provided with any number of sets of horizontal stirring-arms, $g$ $g$, of which there may be any convenient number in each set revolving in or parallel and in proximity to the plane of the horizontal injectors I I. It carries at its lower extremity a hollow steel cylinder, $g^2$, of suitable dimensions and thickness, in the lower portion of which are placed two spiral tubes, $i$ $i$, winding around the spindle $e$. The mercury is carried from the chamber $d^3$ by the rotation of the spindle, through the tubes $i$ $i$, into the upper portion of the cylinder $g^2$, whence it is ejected centrifugally through any number of small holes, $j$ $j$, and the steam, entering at $S'$ and passing up through the vents $h$ $h$, blows out the mercury from the chamber $d^3$ through the holes $h'$ $h'$, made in the cap-plate of the injector and bearing-ring C, directly over each of the aforesaid vents.

A convenient number of steam atomizers or injectors, of suitable metal and of the form hereinafter described, are inserted into the chamber V through its side walls, in the plane of the stirring-arms $g$ $g$. Their arrangement is seen by reference to Figs. 1, 2, 3, and 4, and the dimensions of their parts and their number will depend upon the amount of mercury which they are designed to inject. For the sake of convenience I prefer to use six, of precisely similar form, and to place them in the same horizontal plane. The outer walls of the cylinder V are provided with six collars or seats carefully turned, into each of which the injector-nozzles $n$ $n$ are screwed, as will be seen by reference to Figs. 1 and 4. The spindle $c'$, which takes up steam through the hole $o$, is carried on the two sliding collars $e^3$ $e^3$ in the injector cross-head $c$. The spindle $c'$ is supported at the nozzle by a similar collar, $e^2$. Packing-boxes $z$ $z$ $z$ prevent the escape of steam or mercury through the spaces around the spindle.

The mercury is supplied to the injectors by the pipes $c^2$ $c^2$, which are screwed into each nozzle and pass down through the cover B and into the mercury in the vessel A. Steam is taken up through the pipes $c^3$ $c^3$. The outer extremities rest on the ring $w$, supported by the three horizontal standards $w'$, Figs. 1 and 3, which are screwed to the sides of the cylinder V. Horizontal regulation of the injectors is effected by the wheels W' W', which cause the spindles to rotate on the screw-threads $t$ in the collars $t'$, which are firmly screwed to the outer packing-boxes, $z$ $z$, by the six screws $z'$ and $z'$. Slightly vertical regulation of the injectors above the bearing-ring $w'$ is effected by turning the pipes $c^3$ $c^3$ as the screw-threads and seats at $a^2$ and $a^3$, Fig. 1, are respectively right and left screws. The cylinder V carries on its outer surface, at any suitable point above the atomizers I I, an annular trough, T, of suitable metal and size, for the purpose of supplying mercury to the sprayers in the bearing-ring C, through three sets of suitable supply-pipes, $p'$ $p'$ $p'$, with the ball-joints $p^2$ $p^2$ $p^2$, as shown in Fig. 5. The top of the cylinder V terminates in the head-casting N, of brass or other suitable metal, as shown in Fig. 1, to which it is securely bolted. The spindle $e$ passes through the head N and revolves in a friction-bearing, $k$, screwed into the upper surface of N, and carries the grooved pulley-wheel $W^2$, to which a belt is attached. The upper surface of the head N revolves upon the ball-bearing $x'$ on the circular cross-head N', bolted to the cross-beam N². The float of the mercury in the vessel A is sufficient to keep the cylinder-head N in its position. The periphery of the head N is grooved for the purpose of carrying a belt. At a suitable distance below the head N is placed the supply-trough V², which may be of any suitable material and size, and fastened to the sides of the cylinder V in any desired manner. The water or slime is admitted to the cylinder V by any number of apertures, V', of convenient size, the bottoms of which are in the same plane as that of the trough V². O' is a brass oil-cup shrunk upon the spindle e, for the purpose of catching any lubricating-oil that may fall from the bearing K.

In the interior of the cylinder V are placed the annular copper electrodes (anodes) E and E', carefully turned on the outside to fit the cylinder V, and so curved upon the inside as to slightly diminish the diameter of the column of water or other matter flowing through them. Their size and number will vary with the amount of electrical surface found desirable, and their position in the cylinder V will depend upon the strength of the current desired. They may also be made in the form of a spiral coil of copper wire.

Referring to Fig. 1, it will be seen that the vessel A is surmounted by a flat ring, R, clamped over the top of the cylindrical walls of A by the screws and packing $r'\,r'$. This ring is of spun copper and contains one or more annular amalgamating grooves or riffles, T', placed in that portion of it which is adjacent to vessel A, and may be either horizontal or inclined. Over the plate R, and parallel to it, is placed a flat ring, $v'$, of suitable non-conducting material and dimensions, attached to and revolving with the copper cover B. This ring must be sufficiently broad to cover such portion of the plate R as contains the riffles T'. To the lower surface of this ring is attached one or more annular electrodes, Q', of suitable metal, corresponding in number to the number of riffles in the plate R, and placed over and in close proximity to the same. These electrodes are secured by the screws $r^4\,r^4$, which regulate their distance above the surface of the mercury in the riffles, and they should be sufficiently near the same to admit of a vigorous electric action. At the outer circumference of the ring $v'$ are attached a convenient number of radial blanket-frames, Q, of suitable size and material, revolving with said ring over and parallel to the flat portion of the copper plate R. These arms are attached to the lower surface of the ring $v'$ in any convenient manner, and over them is stretched a loosely-hung annular blanket. As the cover B revolves, the disk $v'$ revolves with it, carrying the rings Q' Q' and the blanket-arms Q Q. Any fumes escaping from the hot mercury in the vessel A will be caught and condensed by the water or slime in the sides of the vessel around the flanged cover B before reaching the riffles or the blankets. For the purpose of forcing the mercury constantly through the apparatus, I provide a pump connecting with the pipe P, by means of which the mercury is pumped into the trough T, from whence it is passed back into the chamber in the casting C.

The application of my improved process in the apparatus is substantially as follows: The vessel A is filled with mercury up to the level of the copper top. Steam is passed through the pipes, heating it to a high temperature. As soon as the mercury is thoroughly heated, the water containing the ore is passed into the cylinder V through the supply-cylinder V² and the holes V', and the steam turned on through the supply-pipe S⁴. A slow rotation is given to the cylinder V and cover B by means of a driving-belt on the wheel-shaped chamber-head N, and the spindle is made to rotate rapidly by a belt on the pulley-wheel W². The electric current is applied in the following manner: The positive pole of the battery is connected with the copper rings E, E', and Q' by any suitable form of connection— such as the copper ring $y'$—secured to and revolving with the trough T, but insulated therefrom, as shown, upon which is pressed a contact-brush, $y$, connected by the wire 1 with the positive pole of the battery. By means of the wire 2 and the insulated screw $y^2$ the electric current is conveyed to the electrode E, thence by means of the wire 3 and the insulated screw $y^3$ to the electrode E', and finally by the wire 4 and the screw $r^4$ to the electrode Q'. The negative pole of the battery is attached to the vessel A at any convenient point, and by any suitable means—such as the screw $y^4$ and the wire 5—by which means all other portions of the apparatus are negatively electrified, including the internal injector, C, to which the current is communicated through the copper cover B and the cylinder V. As soon as steam is turned into the pipe S⁴, the injectors commence to take up the mercury from the vessel A, and discharge it in a spray into the cylinder V at the point J, where the agitation caused by the stirring-arms and the electric current is greatest and where mercury emerges from the centrifugal sprayer. The particles of mercury coming in contact with the constantly-descending particles of ore, and at the same time being kept free from impurities by the cleansing action of the electric current, will amalgamate and fall in the current to the vessel A. In passing the ring E' they will again become subject to the influence of the current, the vulcanite insulating-cylinder $u$ and conical disk $v$ preventing the electric current from passing directly to the copper cover, which is the better conductor. The anode E' is placed a distance above the surface of the mercury in the vessel A just sufficient to produce a strong electric action. The shape of the cover is such that with a constant pressure of water in the cylinder V, the surface of the mercury is forced down at the point B², and the water is allowed to pass under the flat portion of the cover in a thin stream. Any free gold that has escaped amalgamation will be caught and amalgamated on the flat surface of the revolving copper cover. The discharge from the overflow-chamber O passes over the copper plate R and through the trough T', which is about half filled with mercury, where it is again subjected to the action of the electric current passing through the riffle. The blankets attached to the arms Q are sufficiently slack to rub on the copper plate R as they revolve, and they will collect any particles which may have escaped amalgamation in the trough T, and which may afterward be removed from the blanket for further treatment.

I claim as my invention—

1. The process of extracting gold and silver from their ores by the combined action of mercury, electricity, and water, which consists in forcing mercury, either hot or cold, in the form of very fine globules or spray, into the water containing the ore, sand, &c., causing currents of electricity to traverse the water while the mercury is still in a fine state of division, and collecting the amalgam in a suitable vessel, substantially as and for the purposes specified.

2. The process of extracting gold and silver from their ores by the combined action of mercury, electricity, and water, consisting in forcing mercury, either hot or cold, in the form of very fine globules or spray, into a column of water containing the ore, sand, &c., descending with a constant velocity, causing currents of electricity to traverse the descending column, and collecting the amalgam in a suitable vessel, substantially as and for the purposes specified.

3. The process of extracting gold and silver from their ores by the combined action of mercury, electricity, and water, consisting in forcing mercury, either hot or cold, in the form of very fine globules or spray, into a column of water containing the ores, sand, &c., descending with a constant velocity, thoroughly mixing the globules of mercury with the particles of ore, sand, &c., in the descending column of water, causing currents of electricity to traverse the descending column and collecting the amalgam and mercury in any suitable vessel, substantially as and for the purposes specified.

4. The process of extracting gold and silver from their ores by the combined action of mercury, electricity, and water, consisting in forcing mercury, either hot or cold, in the form of very fine globules or spray, into a column of water containing the ore, sand, &c., descending with a constant velocity, thoroughly mixing the globules of mercury with the particles of ore, sand, &c., in the descending columns of water, causing currents of electricity to traverse the descending column, collecting the amalgam in any suitable vessel, and causing the column of water on emerging from the vessel in which the admixture takes place to pass in a thin stream between an electrified copper plate and an electrified surface of mercury, substantially as described, and for the purposes specified.

5. The process of extracting gold and silver from their ores by the combined action of mercury, electricity, and water, consisting in forcing mercury, either hot or cold, in the form of very fine globules or spray, into a column of water containing the ore, sand, &c., descending with a constant velocity, thoroughly mixing the globules of mercury with the particles of ore, sand, &c., in the descending column of water, passing currents of electricity through the descending column, collecting the amalgam in any suitable vessel, causing the water or slime, on emerging from the apparatus in which the admixture takes place, to pass in a thin stream between an electrified copper plate and an electrified surface of mercury, and subjecting the same to further treatment with electrified mercury upon copper plates, substantially as described, and for the purposes specified.

6. The process of extracting gold and silver from their ores by the combined action of mercury, electricity, and water, consisting in forcing mercury, either hot or cold, in the form of very fine globules or spray, into a column of water containing the ore, sand, &c., descending with a constant velocity, thoroughly mixing the globules of mercury with the particles of ore, sand, &c., held in suspension in the descending column of water, passing currents of electricity through the descending column, collecting the amalgam in any suitable vessel, causing the water or slime on emerging from the apparatus in which the admixture takes place to pass in a thin stream between an electrified copper plate and an electrified surface of mercury, subjecting the same to further treatment with electrified mercury upon copper plates, and collecting the residue contained in the water by the combined action of a copper plate and a mechanical collecting-blanket.

7. The process hereinbefore described of extracting gold and silver from their ores by the combined action of mercury, electricity, and water, consisting, first, in forcing any quantity of mercury, either hot or cold, in excess of what is necessary to amalgamate the precious metals contained in the ore, in the form of very fine globules or spray, into a column of water containing ore, sand, &c., descending with a constant velocity, thoroughly mixing the globules of mercury with the particles of ore, sand, &c., held in suspension in the descending column of water, passing currents of electricity through the descending column, and collecting the amalgam in any suitable vessel; second, in causing the water or slime, after passing out of the apparatus in which the first step of the process is carried on, to pass in a thin stream between an electrified copper plate and an electrified surface of mercury, and subjecting the same to further treatment with electrified mercury upon copper plates; third in collecting the residue contained in the water by means of the combined action of a copper plate and a mechanical collecting-blanket; and, fourth, in collecting the excess of mercury used in the process, and repeating the steps, with or without the addition of new mercury, as often as may be deemed advisable.

8. In an apparatus for the extraction of gold and silver from their ores, the combination, as hereinbefore set forth, consisting of a revolving vertical mixing chamber or reservoir, a series of injectors or atomizers, whereby the mercury may be forced into said chamber in the form of fine globules or spray, a revolving agitator provided with a series of stirring-arms, and one or more sets of anodes or cathodes within said chamber, means, substantially as described, for insulating the same, a flanged copper plate or disk secured to and revolving with said chamber, an annular insulating-disk secured to the lower surface of said copper plate or disk, a cylindrical mercury-vessel into which said mixing-chamber discharges and over which said copper disk and mixing-chamber revolve, means, substantially as described, for electrifying said copper plate and the mercury in said mercury-vessel, a series of tubes for supplying mercury to said injectors, a pump connected therewith for the purpose of retransferring the contents of said vessel to said mixing-chamber, a coil of steam-heating pipes placed in the interior of said vessel, a wheel supporting said disk and chamber, through the spokes and hub of which steam is supplied to said atomizers, a bearing within said mercury-vessel upon which said wheel, disk, and mixing-chamber revolve, and means, substantially as described, for revolving the same, an annular copper overflow-plate attached to the upper surface of the side walls of said mercury-vessel, a series of annular amalgamating riffles or troughs containing mercury formed within said plate, through which a current of electricity can be passed, a series of annular anodes respectively placed above and in proximity to said riffles, and revolving with said copper disk, means, substantially as described, for insulating said anodes from said revolving disk, and an annular collecting-blanket surrounding the anodes and revolving with the same above the surface of said annular overflow-plate and outside of said riffles.

9. In an apparatus for the extraction of gold and silver from their ores, the combination, with the revolving mixing-chamber, of a cylindrical chamber-head, a friction-bearing, $k$, and a ball-bearing, $x'$, substantially as shown and described, for the purposes specified.

10. In an apparatus for the extraction of gold and silver from their ores, the combination, with the revolving mixing-chamber V, of a cylindrical chamber-head, N, a friction-bearing, $k$, a ball-bearing, $x'$, and a cross-head, N', bolted to the cross-beam U', as shown and described.

11. In an apparatus for the extraction of gold and silver from their ores, the combination, with the mixing-chamber, of an injector or atomizer situated in its hollow interior and supported within the same, substantially as shown and described.

12. In an apparatus for extracting gold and silver from their ores, the combination, with the mixing-chamber in its hollow interior, of an injector, consisting of the casting $c$, having vertical perforations, and the series of mercury injectors or atomizers, substantially as shown and described.

13. In an apparatus for the extraction of gold and silver from their ores, the combination, with the mixing-chamber in its hollow interior, of an injector having a steam-supply pipe, a series of steam-escape vents, a mercury-chamber, and means, substantially as described, for causing the mercury overflowing from said chamber to pass above said vents, substantially as shown and described.

14. In an apparatus for the extraction of gold and silver from their ores, the combination, with the mixing-chamber, of the vertical injector or atomizer C, with the steam-pipes $s^3$, the packing-box $d$, the mercury-chamber $d^3$, the steam-chamber $d^2$, the steam-vents $h\,h$, and the injection-ports $h'\,h'\,h'$, as shown and described.

15. In an apparatus for the extraction of gold and silver from their ores, the combination, with the mixing-chamber, of an injector or atomizer supported within the same, and serving as an agitator-bearing, substantially as shown and described.

16. In an apparatus for the extraction of gold and silver from their ores, the combination, with the mixing-chamber, of the vertical injector or atomizer C, with the steam-pipes $s^3$, the packing-box $d$, the mercury-chamber $d^3$, the steam-chamber $d^2$, the steam-vents $h\,h$, the injection-ports $h'\,h'$, the spindle-bearing $d'$, and the capstan-screw $d^4$, substantially as shown and described.

17. In an apparatus for the extraction of gold and silver from their ores, the combination, with the mixing-chamber and injector or atomizer supported within the same, of the revolving agitator-spindle, supported by said injector or atomizer, and revolving in a bearing in the head of said mixing-chamber, means substantially as described, for revolving the same, and one or more series of stirring-arms, as shown and described.

18. In an apparatus for the extraction of gold and silver from their ores, the combination, with the mixing-chamber and injector or atomizer supported within the same, of an agitator-spindle supported by said injector or atomizer and revolving in a bearing in the head of said mixing-chamber, means, substantially as described, for revolving the same, one or more series of stirring-arms, a hollow mercury-cylinder surrounding the agitator-spindle and revolving within the same, and having a series of discharge-holes, one or more spiral tubes for supplying mercury to said cylinder, substantially as shown and specified.

19. In an apparatus for the extraction of gold and silver from their ores, the combination, with the mixing-cylinder and an injector or atomizer supported in the same, of a cylindrical mercury-reservoir in said injector or atomizer, a spindle revolving within said mixing-chamber, a hollow mercury-cylinder having a series of discharge-holes surrounding and revolving with said spindle, one or more spiral tubes for conveying mercury from said reservoir to said hollow mercury-cylinder, substantially as shown and described.

20. In an apparatus for the extraction of gold and silver from their ores, the combination, with the mixing-chamber, of an injector or atomizer supported within the same and serving as an electrode, substantially as shown and described.

21. In an apparatus for the extraction of gold and silver from their ores, the hereinbefore-described combination, with the mixing-chamber, of a series of mercury injectors or atomizers introduced into the side walls of the same, having each the nozzle or mercury-chamber $n$, means, substantially as described, for attaching the same to said side walls, the hollow cross-head $c$ with a cylindrical inner surface, the hollow steam-spindle $c'$, closed at one end and open at the other, having one or more steam-ports, $o$, in its side walls passing through said cross-head and extending into said nozzle, means, substantially as described, for horizontally regulating and supporting the same in said nozzle and cross-head, and for preventing the escape of steam and mercury through the space around said spindle, pipes for supplying mercury and steam to said nozzle and cross-head, respectively, and means, substantially as described, for supporting and regulating said series of atomizers or injectors.

22. In an apparatus for the extraction of gold and silver from their ores, the combination, with the mixing-chamber, of a series of injectors or atomizers introduced into the side walls of the same, having each a nozzle or mercury-chamber, $n$, means, substantially as described, for securing the same to said walls, a hollow steam-spindle, $c'$, extending into said nozzle, means, substantially as described, for regulating and supporting the same and preventing the escape of mercury through the space around said spindle, and a pipe for supplying mercury to said nozzle, substantially as shown and described.

23. In an apparatus for the extraction of gold and silver from their ores, the combination, with the mixing-chamber, of a series of mercury-injectors introduced into the side walls of the same, having each a hollow cross-head, $c$, a hollow steam-spindle, $c'$, passing through said cross-head, and having one or more steam-ports, $o$, in its side walls, means, substantially as described, for regulating and supporting the same and preventing the escape of steam from the space around it, and a pipe for supplying steam to said cross-head, substantially as shown and described.

24. In an apparatus for the extraction of gold and silver from their ores, the combination, with the mixing-chamber V, of the vulcanite insulating-cylinder $u$, as shown and described, and for the purposes specified.

25. In an apparatus for the extraction of gold and silver from their ores, the combination of a vertical revolving mixing chamber or reservoir, a series of atomizers or injectors whereby mercury may be forced into said chamber in the form of very fine globules or spray, a revolving agitator within said chamber provided with a series of stirring-arms, one or more sets of anodes or cathodes, and means, substantially as described, for insulating the same within said chamber, and a cylindrical mercury-vessel for collecting the mercury and amalgam from said chamber, substantially as shown and described, and for the purposes specified.

26. In an apparatus for the extraction of gold and silver from their ores, the combination of a vertical revolving mixing chamber or reservoir, a series of injectors or atomizers whereby mercury may be forced into said chamber in the form of very fine globules or spray, a revolving agitator within said chamber provided with a series of stirring-arms, and one or more sets of anodes or cathodes, and means, substantially as described, for insulating the same within said chamber, a flanged copper plate secured to and revolving with said chamber, and a cylindrical mercury-vessel in which said disk and mixing-chamber revolve, all substantially as shown and described, and for the purposes specified.

27. In an apparatus for the extraction of gold and silver from their ores, the combination, with the mercury-vessel A, of a copper overflow-plate surrounding and attached to the upper surfaces of the same provided with a series of amalgamating-riffles, through which an electrical current may be passed, as shown and described.

28. In an apparatus for the extraction of gold and silver from their ores, the combination, with the mercury-vessel A, of the flanged wheel U, with the spokes $b'$, and the hollow standards $a'$, revolving horizontally in said vessel, as shown and described.

29. In an apparatus for the extraction of gold and silver from their ores, the combination, with the mercury-vessel A, of the wheel U, the ball-bearing $x$, and the vertical pillar $l$, with the rollers $l'\,l'$, as shown and described.

30. In an apparatus for the extraction of gold and silver from their ores, the combination, with the flanged copper plate B, of the insulating-disk $v$, with the mortised head-collar $m$, as shown and described, and for the purposes specified.

31. In an apparatus for the extraction of gold and silver from their ores, the combination, with the flanged copper plate or disk B, of a series of anodes, and means for insulating them from said copper plate, substantially as shown and described.

32. In an apparatus for the extraction of gold and silver from their ores, the hereinbefore set forth combination, consisting of the mixing chamber or reservoir, a series of injectors or atomizers in the side walls of the same whereby mercury may be forced into the same in the form of very fine globules or spray, a mercury-vessel into which said chamber discharges, and a series of tubes for taking mercury from said vessel and supplying it back to said injectors, as shown and described.

33. In an apparatus for the extraction of gold and silver from their ores, the combination, hereinbefore set forth, of the revolving mixing chamber or reservoir, a series of injectors or atomizers whereby mercury may be forced into said chamber in the form of very fine globules or spray, a mercury-vessel into which said mixing-chamber discharges, and a pump connected therewith for retransferring the contents of said vessel to said mixing-chamber.

34. In an apparatus for the extraction of gold and silver from their ores, the combination, hereinbefore described, of a revolving mixing chamber or reservoir, a series of injectors or atomizers whereby the mercury may be forced into said chamber in the form of very fine globules or spray, a mercury-vessel into which said mixing-chamber discharges, a series of tubes for supplying mercury to said injectors, and a pump connected therewith for retransferring the contents of said vessel to said mixing-chamber.

35. In an apparatus for the extraction of gold and silver from their ores, the combination of a vertical revolving mixing chamber or reservoir, a series of injectors or atomizers whereby mercury may be forced into said chamber in the form of very fine globules or spray, a revolving agitator within said chamber provided with a series of stirring-arms, one or more sets of anodes and cathodes, and means, substantially as described, for insulating the same within said chamber, a flanged copper plate or disk secured to and revolving with said chamber, an annular insulating-disk, substantially as shown, secured to the lower surface of said copper plate or disk, and a cylindrical mercury-vessel into which said mixing-chamber discharges and in which said disk and mixing-chamber revolve, substantially as shown and described.

36. In an apparatus for the extraction of gold and silver from their ores, the combination of a vertical mixing chamber or reservoir, a series of injectors or atomizers whereby mercury may be forced into said chamber in the form of very fine globules or spray, a revolving agitator within said chamber provided with a series of stirring-arms, one or more sets of anodes and cathodes within said chamber, and means, substantially as described, for insulating the same, a flanged copper plate or disk revolving with said chamber, an annular insulating-disk, substantially as shown, secured to the lower surface of said copper plate or disk, a cylindrical mercury-vessel into which said mixing-chamber discharges, and over which said disk revolves, and means, substantially as described, for electrifying said copper plate and the mercury in said mercury-vessel, substantially as shown and described.

37. In an apparatus for the extraction of gold and silver from their ores, the combination of a vertical revolving mixing chamber or reservoir, a series of injectors or atomizers whereby mercury may be forced into said chamber in the form of very fine globules or spray, a revolving agitator within said chamber provided with a series of stirring-arms, one or more sets of anodes and cathodes within said chamber, means, substantially as described, for insulating the same, a flanged copper plate or disk secured to and revolving with said chamber, an annular insulating-disk, substantially as shown, secured to the lower surface of said copper plate or disk, a cylindrical mercury-vessel into which said mixing-chamber discharges, and over which said disk and mixing-chamber revolve, means, substantially as described, for electrifying said copper plate and the mercury in said mercury-vessel, and a series of tubes for supplying mercury to said injectors, substantially as shown and described.

38. In an apparatus for the extraction of gold and silver from their ores, the combination of a vertical revolving mixing chamber or reservoir, a series of injectors or atomizers whereby mercury may be forced into said chamber in the form of very fine globules or spray, a revolving agitator within said chamber provided with a series of stirring-arms, one or more sets of anodes and cathodes, and means, substantially as described, for insulating the same within said chamber, a flanged copper plate or disk secured to and revolving with said chamber, an annular insulating-disk, substantially as shown, secured to the lower surface of said copper plate of disk, a cylindrical mercury-vessel into which said mixing-chamber discharges, and over which said disk and mixing-chamber revolve, means, substantially as described, for electrifying said copper plate and the mercury in said mercury-vessel, a series of tubes for supplying mercury to said injectors, and a pump connected therewith for the purpose of retransferring the contents of said vessel to said mixing-chamber, all substantially as shown and described.

39. In an apparatus for the extraction of gold and silver from their ores, the combination, as hereinbefore set forth, of a vertical revolving mixing chamber or reservoir, a series of injectors or atomizers whereby the mercury may be forced into said chamber in the form of fine globules or spray, a revolving agitator within said chamber provided with a series of stirring-arms, and one or more sets of anodes and cathodes within said chamber, means, substantially as shown, for insulating the same, a flanged copper plate secured to and revolving with said chamber, an annular insulating-disk, substantially as shown, secured to the lower surface of said copper plate or disk, a cylindrical mercury-vessel into which said mixing-chamber discharges, and over which said disk and mixing-chamber revolve, means, substantially as described, for electrifying said copper plate and the mercury in said mercury-vessel, a series of tubes for supplying mercury to said injectors, a pump connected therewith for the purpose of retransferring the contents of said vessel to said mixing-chamber, and a coil of steam-heating pipes placed in the interior of said vessel, substantially as shown and described.

40. In an apparatus for the extraction of gold and silver from their ores, the combination, as hereinbefore set forth, of a vertical revolving mixing chamber or reservoir, a series of injectors or atomizers whereby the mercury may be forced into said chamber in the form of fine globules or spray, a revolving agitator within said chamber provided with a series of stirring-arms, and one or more sets of anodes and cathodes within said chamber, and means, substantially as described, for insulating the same, a flanged copper plate secured to and revolving with said chamber, an annular insulating-disk, substantially as shown, secured to the lower surface of said copper plate or disk, a cylindrical mercury-vessel into which said mixing-chamber discharges, and over which said disk and mixing-chamber revolve, means, substantially as described, for electrifying said copper plate and the mercury in said mercury-vessel, a series of tubes for supplying mercury to said injector, a pump connected therewith for the purpose of retransferring the contents of said vessel to said mixing-chamber, a coil of steam-heating pipes placed in the interior of said vessel, and an annular copper overflow-plate attached to the upper surface of the side walls of said mercury-vessel, substantially as shown and described.

41. In an apparatus for the extraction of gold and silver from their ores, the combination, as hereinbefore set forth, of a vertical revolving mixing chamber or reservoir through which the water or slimes containing the ore to be treated are passed, a series of injectors or atomizers whereby the mercury may be forced into said chamber in the form of fine globules or spray, a revolving agitator within said chamber provided with a series of stirring-arms, and one or more sets of anodes and cathodes within said chamber, and means, substantially as described, for insulating the same, a flanged copper plate secured to and revolving with said chamber, an annular insulating-disk, substantially as described, secured to the lower surface of said copper plate or disk, a cylindrical mercury-vessel into which said chamber discharges and over which said disk and mixing-chamber revolve, means, substantially as described, for electrifying said copper plate and the mercury in said mercury-vessel, a series of tubes for supplying mercury to said injectors, a pump connected therewith for the purpose of retransferring the contents of said vessel to said mixing-chamber, a coil of steam-heating pipes placed in the interior of said vessel, a bearing-wheel supporting said disk and chamber, through the spokes and hub of which steam is supplied to said injectors or atomizers, a bearing within said mercury-vessel, upon which said wheel, disk, and mixing-chamber revolve, and means, substantially as described, for revolving the same, and an annular copper plate attached to the upper surface of the side walls of said mercury-vessel, substantially as shown and described.

42. In an apparatus for the extraction of gold and silver from their ores, the combination, as hereinbefore set forth, of a vertical revolving mixing chamber or reservoir, a series of injectors or atomizers whereby the mercury may be forced into said chamber, in the form of fine globules or spray, a revolving agitator within said chamber provided with a series of stirring-arms, and one or more sets of anodes and cathodes within said chamber, a flanged copper plate secured to and revolving with said chamber, an annular insulating-disk, substantially as described, secured to the lower surface of said copper plate or disk, a cylindrical mercury-vessel, into which said mixing-chamber discharges, and over which said disk and mixing-chamber revolve, means, substantially as described, for electrifying said copper plate and the mercury in said mercury-vessel, a series of tubes for supplying mercury to said injectors, a pump connected therewith for the purpose of retransferring the contents of said vessel to said mixing-chamber, a coil of steam-heating pipes placed in the interior of said vessel, a wheel-bearing supporting said disk and chamber, through the spokes and hub of which steam is supplied to said atomizer, a bearing within said mercury-vessel, upon which said wheel, disk, and mixing-chamber revolve, and means, substantially as described, for revolving the same, an annular copper overflow-plate attached to the upper surface of the side walls of said mercury-vessel, and a series of annular amalgamating riffles or troughs for containing mercury formed within said plate, through which a current of electricity may be passed, substantially as shown and described.

43. In an apparatus for the extraction of gold and silver from their ores, the combination, as hereinbefore set forth, of a vertical revolving mixing chamber or reservoir, through which the water or slimes containing the ore to be treated are passed, a series of injectors or atomizers whereby the mercury may be forced into said chamber in the form of fine globules or spray, a revolving agitator within said chamber provided with a series of stirring-arms, and one or more sets of anodes and cathodes within said chamber, a flanged copper plate secured to and revolving with said chamber, an annular insulating-disk, substantially as described, secured to the lower surface of said copper disk or plate, a cylindrical mercury-vessel, into which said mixing-chamber discharges and over which said disk and mixing-chamber revolve, means, substantially as shown, for electrifying said copper plate and the mercury in said mercury-vessel, a series of tubes for supplying mercury to said injectors, a pump connected therewith for the purpose of retransferring the contents of said vessel to said mixing-chamber, a coil of steam-heating pipes placed in the interior of said vessel, a wheel-bearing supporting said disk and chamber, through the spokes and hub of which steam is supplied to said atomizers, a bearing within said mercury-vessel upon which said wheel, disk, and mixing-chamber revolve, and means, substantially as described, for revolving the same, an annular copper overflow-plate attached to the upper surface of the side walls of said mercury-vessel, a series of annular amalgamating riffles or troughs for containing mercury formed within said plate, through which a current of electricity may be passed, and a series of annular anodes respectively placed above and in proximity to said riffles, and revolving with said copper disk, and means, substantially as described, for insulating said anodes from said revolving disk, substantially as shown and described.

In testimony whereof I have hereunto subscribed my named this 27th day of November, A. D. 1883.

CHARLES P. BONNETT.

Witnesses:
WILLARD P. BUTLER,
EDWIN T. RICE.